April 13, 1948.   G. JAEGER   2,439,774
CONCRETE MIXER
Filed May 1, 1946

INVENTOR.
Gebhard Jaeger.
BY
*Cubett, Mohney & Miller*
ATTORNEYS

UNITED STATES PATENT OFFICE 2,439,774

CONCRETE MIXER

Gebhard Jaeger, Columbus, Ohio, assignor to The Jaeger Machine Company, Columbus, Ohio, a corporation of Ohio Application May 1, 1946, Serial No. 666,395

3 Claims. (Cl. 259—172)

The present invention relates to concrete mixers. It has to do, particularly, although not exclusively, with concrete mixers or apparatus of portable nature and of the non-tilting type, wherein the structure includes a batch hopper or bucket for loading the mixer, and wherein means is provided for agitating the hopper or bucket to automatically clean the same, that is to say, to prevent aggregate from sticking to the inner side walls or surfaces of the hopper or bucket.

One of the objects of the present invention is to provide novel and relatively simple means or mechanism which is operable during the rotation of the mixing drum, for automatically agitating the batch hopper or charging bucket to cause an even flow or movement of the materials into the mixing drum and to prevent such materials from sticking to and becoming accumulated upon the inner walls or surfaces of the hopper or bucket.

Another object of the present invention is to provide improved means for varying the agitating action applied to the hopper or bucket in accordance with the nature or character of the mix or aggregate being supplied to the mixing drum.

Another object of the present invention is to provide a movable gate for controlling the discharge opening of the batch hopper or bucket, in which the gate also serves to separate the batch hopper or bucket from its agitating means at predetermined times.

A further object of the invention is to provide improved means for adjusting the amount of travel during the swinging or agitating movement of the batch hopper or bucket relative to the mixing drum, and also the speed of movement of said hopper.

In concrete mixers of the non-tilting type, it is often desirable to employ a batch hopper or charge bucket for loading the mixing drum of the structure. In such type of mixer and to prevent the aggregate from sticking to the inner walls or surfaces of the hopper or bucket, it is desirable to provide some automatic means for cleaning the same. Generally speaking, and in accordance with the present invention, the batch hopper or bucket is preferably mounted upon upright members of the mixer frame so as to hinge the hopper adjacent its top edge with relation to the frame uprights. This allows the hopper to be moved in and out at the bottom or discharge end thereof and to bump, with considerable force, against a part, such as a stop, which is preferably located on the mixer frame at a point adjacent to lower or discharge end of the swingable hopper. This jarring action loosens any material which may have a tendency to adhere to the inner walls of the hopper and also has the further advantage of causing or accelerating the flow of material into the mixer at a relatively faster rate than if the hopper were not in motion.

In accordance with one form of the present invention the hopper or charge bucket actuating or agitating means or mechanism comprises the coupling to or extending of one of the drum roller shafts and mounting a cam upon its outer end. The batch hopper or bucket is provided at its lower end portion with a bracket or depending member or portion. Positioned between the cam and the hopper bracket is a pivoted lever arm carrying at one end an idler roller adapted to engage the face of the cam, the other end of the lever being located in a position so as to contact the bracket carried by the batch hopper. As the drum roller shaft is revolved to rotate the mixing drum, the cam is also rotated. As the cam rotates, the roller on the pivoted lever arm rides over its face to gradually move the batch hopper lower portion outwardly away from the mixing drum at a relatively slow rate of movement. When, however, the roller drops off abruptly from the high point of the cam face, the batch hopper returns very rapidly by gravity toward the mixing drum and as it strikes, with considerable force, a portion of the framework of the mixer, the batch hopper is jarred, thus causing downward movement of any aggregate within the hopper and preventing an accumulation of such aggregate or material upon the walls thereof. Adjustment means are provided for properly locating the cam on its drum roller shaft, and an adjustable contact member is provided on the hopper bracket for regulating or controlling the amount of oscillating movement or motion which is imparted to the hopper.

The agitating or shaking of the batch hopper is effected only when the control gate therefor is in open position, with the drum of the mixer revolving, the gate being provided with preferably wedge-like members which engage a bar or the like carried by the frame of the mixer, which wedge-like members serve to move the batch hopper away from the mixing drum when the gate is moved into its closed position.

The foregoing and other objects and advantages of the present invention will appear from the following description and appended claims when considered in connection with the accompanying drawings forming a part of this specification, wherein similar reference characters designate corresponding parts in the several views.

Figure 1:
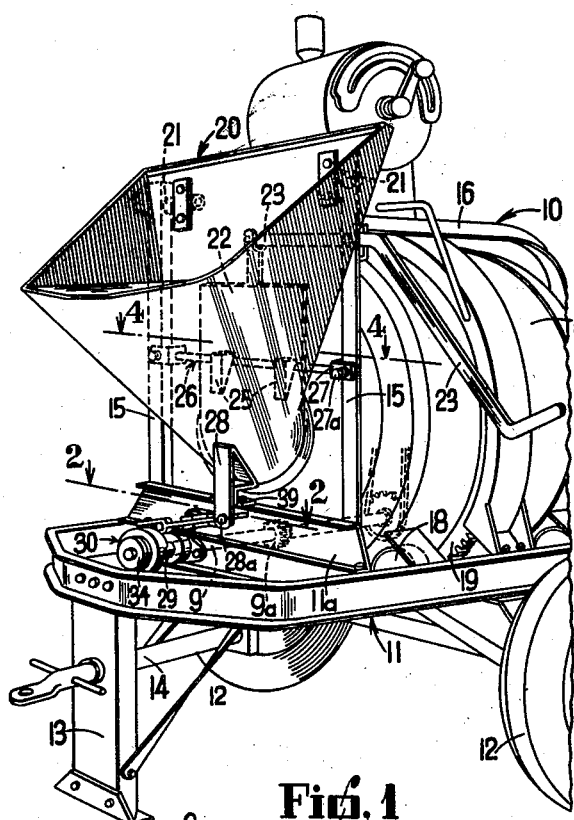
Fig. 1 is a perspective view of a concrete mixing machine or apparatus embodying the present invention.
Figure 3:
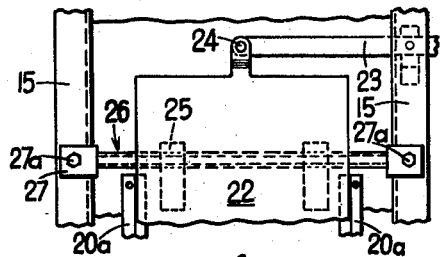
Fig. 3 is a fragmentary front elevational view of one form of batch hopper gate and adjusting means embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation.

Referring now particularly in Figs. 1 to 6, inclusive of the drawings, the form of the present invention shown in these figures is applied, by way of example, to a portable type non-tiltable concrete or the like mixing machine or apparatus. The machine or apparatus is shown as a whole at 10 in Fig. 1 and comprises a chassis or main frame 11 having an axle carrying a pair of rear supporting wheels 12, the frame being of the trailer type and having at its forward end an upright support foot or standard 13. As shown, the machine or apparatus also carries a slidable draw bar or retractable tow pole 14 which permits the machine to be coupled or connected to and drawn along behind a towing vehicle (not shown).

The frame 11, as shown, carries a cross frame member 11a and front upright frame members 15 which are braced by horizontal frame members 16 (one being shown) from rear upright frame members (not shown). The frame member 11 provides a cradle-like structure which carries a revolvable mixing drum 17 which is mounted in conventional manner and revolves on spaced rollers 18, two of which are shown at the right in Fig. 1. The drum 17 is provided with the usual external ring gear 19 which meshes with a gear 9a carried by a power driven shaft 9, see Fig. 2, which receives its source of power preferably from an internal combustion engine which may be located at the far side of the apparatus of Fig. 1, the engine not being shown.

The apparatus includes a batch hopper or bucket, shown as a whole at 20. As shown, merely by way of example, the batch hopper 20 is hingedly mounted at 21 in any suitable manner upon the upright frame members 15 adjacent their upper ends. The lower end of the batch hopper or bucket 20 has a discharge throat or portion which fits into and registers with a charge opening formed in the adjacent end wall of the mixing drum 17. It is to be understood that the throat portion of the batch hopper 20 extends into the opening in the drum, this for the purpose of permitting the hopper to be swung in and out about its hinge or pivot points 21, within a limited range and without separating the throat and mixing drum.

Figure 4:
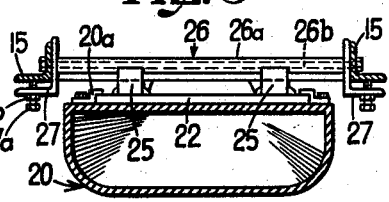
Fig. 4 is a horizontal sectional view taken substantially along the line 4—4 of Fig. 1, looking in the direction of the arrows.
Figure 5:
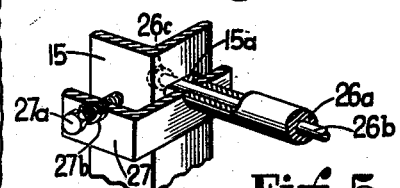
Fig. 5 is a fragmentary perspective view, partly in section and partly broken away, illustrating one form of means for adjusting the movement of the batch hopper relative to the mixing drum.

The throat or discharge end or opening of the batch hopper 20 is controlled by a slidable gate member 22 which is guided in its up and down or opening and closing movements by guides 20a (Fig. 4). The gate member 22 is adapted to be raised and lowered from closed to open position and vice versa, by a manually actuated control arm 23 whose inner end is pivotally connected at 24 with the gate 22. The gate 22, as shown, is provided on its inner or rear face with a pair of spaced wedge-like blocks or members 25, for a purpose to be described.

As seen in Figs. 1, 3, 4 and 5, the upright frame members 15 carry a transversely extending substantially horizontal adjustment bar assembly or unit, shown as a whole at 26. This bar assembly or unit 26, as shown in the present form of the invention, comprises a length of tubing 26a having a through bolt or rod 26b whose end portions extend through slots or openings 15a formed in the upright frame members 15, one of which is shown particularly in Fig. 5. The ends of the tube 26a bear against the adjacent faces of angle members or clips 27 which are provided with set screws 27a and lock nuts 27b. Thus, when the rod assembly is adjusted in the slots 15a to the desired position with relation to the frame members 15, the nuts 26c are tightened down to hold the rod and tubing in its adjusted position, whereupon the set screws 27a and lock nuts 27b are also tightened to maintain the bar assembly or unit 26 in its adjusted position. When a different adjustment of the bar 26 is desired, the set screws 27a and lock nuts 27b, together with the nuts 26c, are loosened and the rod assembly or unit moved to the desired position within the slots 15a.

Figure 6:
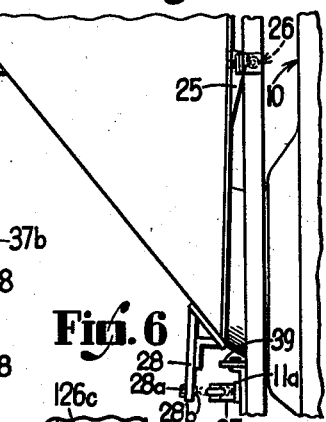
Fig. 6 is a side elevational view of the batch hopper or bucket and the associated adjacent parts of the mixing machine or apparatus, showing the hopper being maintained out of contact with the means for swinging or agitating it.

As clearly seen in Fig. 6 of the drawings, when the gate 22 is in its lower or closed position, the upper or wider portions of the wedge-like members 25 are in contact with the rod assembly 26, thus maintaining the batch hopper 20 in its outward tilted position and out of contact with the contacting or agitating means therefor.

As seen in Figs. 1 and 6, the lower or discharge end portion of the batch hopper 20 is provided with a bracket or member 28 which is adapted to be engaged or contacted by means or mechanism for agitating or jarring the hopper intermittently at predetermined times.

As mentioned above, the power driven shaft 9 (see Figs. 1 and 2) is provided with an extension 29 which carried a cam member shown as a whole at 30, this cam member having a hub portion 31 which is adjustably held on the shaft in any suitable manner, as by means of set screws or the like 31a, see Fig. 2. The cam 30 has a stepped portion or inwardly extending rise 32 on its inner face, see Fig. 2, and the cam as a whole and as shown, is held upon the shaft extension 29 by a nut and lock washer assembly 33 which engage and bind against a plurality of shims or plain washers 34. Thus, the cam 30 is held in position so as to be revolved or rotated by the shaft 9 and shaft extension 29 as the drum 17 is rotated. Moreover, it may be adjusted longitudinally and held in the desired adjusted position by the set screws 31a.

Figure 2:
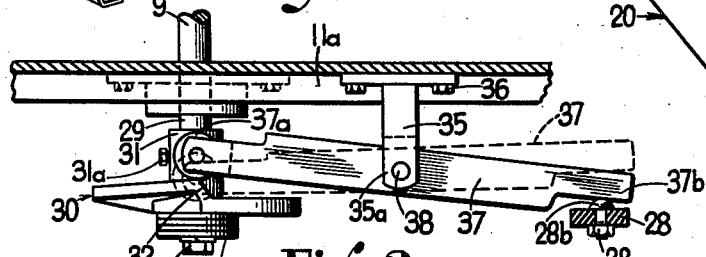
Fig. 2 is an enlarged fragmentary sectional view, partly in elevation, taken substantially along the line 2—2 of Fig. 1, looking in the direction of the arrows.

A bracket 35 is secured at 36 to the cross frame member 11a. The bracket is bifurcated at its outer end at 35a and supports a pivoted lever or rocker arm 37, pivoted intermediate its ends at 38, to the bracket 35 in such a manner that it may swing about its pivot 38 toward and away from the frame member 11a and the cam 30, as best illustrated in Fig. 2. The end of the rocker arm or member 37 adjacent the cam 30 is also bifurcated and carries an idler roller 37a. This roller contacts the adjacent face of the cam 30. The opposite end portion 37b of the lever 37 is adapted to contact, as shown, the head 28b of a bolt 28a carried by the batch hopper bracket member 28, see particularly Figs. 1 and 2.

As the shaft 9 revolves or rotates, the extension 29 thereof and cam 30 rotate or revolve as a unit therewith. The roller 37a rolls or rides over the adjacent face of the cam as the cam revolves. As the upward incline of the cam progressively increases the lever arm 37 is moved about its pivot 38 toward its full line position of Fig. 2 until the roller 37a has ridden over the high point of cam step 32. During this movement, the lower end of the batch hopper 20 is moved gradually in an outward direction away from the revolving mixing drum 17. When, however, the roller 37a clears and drops suddenly from the cam step 32 onto the adjacent flat face of the cam, the hopper 20 swings inwardly toward the mixing drum and strikes a bumper block 39 which, as shown, is mounted on the upper flange of the cross frame member 11a in the vicinity of the hopper bracket or depending member 28. The abrupt drop-off of the cam allows the return, by gravity, of the batch hopper 20 very rapidly, thus subjecting the hopper and its contents to a sudden and severe jar or jolt when it strikes the bumper block 39. Such jarring of the hopper tends to clean the inner surfaces of the hopper walls and free them of any aggregate which may have accumulated on them, such aggregate being fed through the discharge end portion of the hopper and through the charge opening of the mixing drum into said drum.

As suggested above, by virtue of the set screws or bolts 31a which extend through the hub portion 31 of the cam and engage the shaft extension 29, the cam 30 may be properly adjusted by sliding it on said extension. This permits the cam to be properly located, and with the contact member 28b on hopper bracket 28 which may also be adjusted, it is possible to regulate and control the amount of swinging motion or movement imparted to the hopper 20 relative to the mixing drum.

It will be understood that the in and out movements or swinging action of the batch hopper 20 are effected only when the hopper gate 22 is in its open or elevated position and when the mixing drum 17 and shaft 9 are being revolved by the power means, such as an internal combustion engine (not shown).

When the gate 22 is in its closed or lowered position, as best seen in Fig. 6, the wedge-like members 25 are in engagement with the rod assembly 26, and thus hold the bracket or depending member 28 of the hopper 20 out of contact with, or reach of, the end portion 37b of the swingable or oscillatable lever arm 37.

Figures 7, 8:
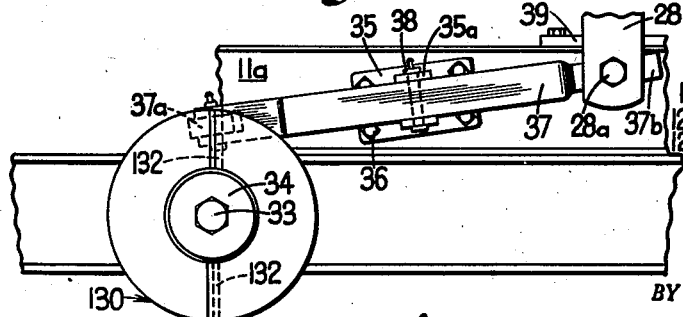
Fig. 7 is an enlarged fragmentary front elevational view illustrating a modified form of means or mechanism for agitating or moving the hopper.
Fig. 8 is an enlarged sectional view, partly in elevation, of somewhat modified means for adjusting the position of the hopper in accordance with the invention.

In Fig. 7 of the drawings there is shown mechanism like that illustrated in the preceding views but with a somewhat modified cam member 130 which has, as shown, a pair of stepped portions or rises 132, in lieu of the single stepped portion or projection 32, shown in Fig. 2. Thus, the cam 130, if revolved at the same rate of speed as the cam 30 of Fig. 2, will effect twice the amount of in and out movements of the batch hopper 20 as will the cam 30. This double-stepped type of cam, or even one having additional stepped portions, may be desirable for use when certain types or kinds of mixes or aggregates are being handled by the mixing machine or apparatus of the present invention.

In Fig. 8 of the drawings a slightly modified form of adjustment bar assembly or unit 126 is shown. In this form of the invention, a length of tubing 126a has a through bolt 126b which carries at each end, an insert or round block 126c provided with an off-center or eccentric hole 126d. For adjusting the rod assembly 126 relative to the upright frame members 15, a fragment of one of which is shown in Fig. 8, the usual nuts (not shown) on the ends of the through bolt 126b are loosened, the tubing 126a rotated sufficiently to obtain the proper adjustment of the unit, and the through bolt then drawn tight to hold the assembly or unit in its newly adjusted position.

From the foregoing it will be seen that I have provided an improved shaking batch hopper or bucket and means for shaking or agitating it, which includes features of adjustability permitting the means or mechanism to be set or adjusted in accordance with the desired needs of the apparatus or machine of which it forms a part, such needs being largely dependent upon the kind of type of aggregate or materials to be handled or mixed by the machine or apparatus. It will also be seen that relatively inexpensive and simplified means or mechanism has been provided for effecting the shaking or agitation of the batch hopper or bucket, in which the power for operating said means or mechanism is derived from the source of power, for example, the internal combustion engine unit of the machine, which is employed to rotate or revolve the mixing drum. The structure, in its several aspects and embodying the present invention, is so designed as to be capable of reasonably quick and easy application to a mixer of the character described above, without necessitating the reorganization or dismantling of any of the standard parts of said mixer.

I claim:

1. In a concrete mixing machine including a mixing drum and a power driven shaft for imparting rotary movement to the drum, said machine comprising a main frame and spaced upright frame members located adjacent an end of the mixing drum, a drum charging hopper swingably mounted upon the upright frame members to swing outwardly at its lower end away from the drum, said hopper having a discharge throat registering with a charge opening formed in the mixing drum, a slidable gate for controlling the passage of material through the discharge throat of said hopper, means on the gate and engageable with a part of the machine for moving the lower portion of the hopper outwardly away from the mixing drum at predetermined times while the gate is in closed position, and means operable when the gate is in open position to impart a jarring action to the hopper whereby to free the inner wall surfaces of the hopper of material accumulated thereupon.

2. In a concrete mixing machine including a mixing drum and a power driven shaft for rotating the drum, said machine including a main frame and a pair of upright frame members located adjacent one end of said drum, a drum charging bucket swingably mounted upon the upright frame members whereby its lower end portion may be swung outwardly away from the drum, said bucket having a discharge opening registering with a charge opening in the drum, a slidable gate for controlling the passage of material through the discharge end of said bucket, an adjustable bar assembly carried by said upright frame members and disposed in substantially horizontal position, members carried by said gate and engageable with said bar assembly to swing the bucket outwardly at its lower end away from the mixing drum and maintain it in such position when the gate is moved to and maintained in its closed position, means extending transversely of the machine and including a pivoted oscillatable lever arm for swinging the bucket outwardly when the gate is in open position, and cam means drivingly connected with said power driven shaft and engaging a portion of said oscillatable lever arm to swing the same and effect the positive outward movement and gravity return of said bucket.

3. A concrete mixing machine according to claim 2, wherein a stop is disposed between the upright frame members, and wherein said cam means is so designed and proportioned as to move the lever arm in one direction to swing the bucket to its outer position and to intermittently release said arm, whereby the bucket gravitates toward the drum and into engagement with said stop to impart intermittent jarring action to said bucket.

GEBHARD JAEGER.

REFERENCES CITED

The following references are of record in the file of this patent:

UNITED STATES PATENTS

| Number | Name | Date |
|---|---|---|
| 2,223,307 | Pacchetti et al. | Nov. 26, 1940 |
| 2,398,549 | Murphy | Apr. 16, 1946 |